United States Patent [19]
Burdyn et al.

[11] 3,927,716
[45] Dec. 23, 1975

[54] ALKALINE WATERFLOODING PROCESS

[75] Inventors: Ralph F. Burdyn; Harry L. Chang; William R. Foster, all of Dallas, Tex.

[73] Assignee: Mobil Oil Corporation, New York, N.Y.

[22] Filed: Sept. 25, 1974

[21] Appl. No.: 508,965

[52] U.S. Cl. ............... 166/270; 166/273; 166/274
[51] Int. Cl.² ................. E21B 43/22; E21B 43/27
[58] Field of Search ........... 166/270, 271, 273–275, 166/305 R

[56] References Cited
UNITED STATES PATENTS

| | | | |
|---|---|---|---|
| 3,111,984 | 11/1963 | Reisberg | 166/270 |
| 3,111,985 | 11/1963 | Reisberg | 166/270 |
| 3,251,412 | 5/1966 | Cooke, Jr. et al. | 166/275 |
| 3,298,436 | 1/1967 | McCardell | 166/270 |
| 3,344,858 | 10/1967 | Gilchrist et al. | 166/270 |
| 3,358,757 | 12/1967 | Holmes | 166/270 |
| 3,368,621 | 2/1968 | Reisberg | 166/270 |
| 3,464,492 | 9/1969 | Friedman | 166/274 X |

OTHER PUBLICATIONS

Foster, "A Low Tension Waterflooding Process," Journal of Pet. Tech., Vol. 25, Feb. 1973, pp. 205–210.
Reisberg, et al., "Interfacial Phenomena in Crude Oil–Water Systems," Producers Monthly, Vol. 21, Nov. 1956, pp. 43–50.

*Primary Examiner*—Stephen J. Novosad
*Attorney, Agent, or Firm*—C. A. Huggett; William D. Jackson

[57] ABSTRACT

A process for the recovery of oil from a subterranean oil reservoir involving the injection of an aqueous alkaline solution to neutralize organic acids in the reservoir oil to form surfactants in situ. This solution contains sufficient alkaline agent to impart a pH within the range of 11.5 to 13 and a monovalent salt within the range of 0.5 to 2.0 weight percent. The initial aqueous alkaline slug may be followed by a second alkaline slug containing a thickening agent.

10 Claims, 4 Drawing Figures

ALKALINE WATERFLOODING PROCESS

BACKGROUND OF THE INVENTION

This invention relates to the recovery of oil from subterranean oil reservoirs and more particularly to improved waterflooding operations involving the injection of an aqueous alkaline medium.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus it has been proposed to add surfactants to the injected water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Processes which involve the injection of aqueous surfactant solutions in order to reduce the oil-water interfacial tension are commonly referred to as low tension waterflooding techniques. To date one of the more promising low tension waterflooding techniques involves the injection of aqueous solutions of petroleum sulfonates within a designated equivalent weight range and under controlled conditions of salinity. For example, in a paper by W. R. Foster entitled "A Low Tension Waterflooding Process", JOURNAL OF PETROLEUM TECHNOLOGY, Vol. 25, Feb. 1973, pp. 205–210, there is disclosed a low tension waterflood process which involves the sequential injection of a protective slug, a surfactant slug, and a mobility control slug. The protective slug is an aqueous solution of sodium chloride which is injected in order to displace the reservoir waters ahead of the subsequently injected surfactant slug. This slug is substantially free of divalent ions which would tend to precipitate the subsequently injected surfactant.

The surfactant slug comprises an aqueous solution of petroleum sulfonates exhibiting an average equivalent weight within the range of 350–500 and which contains sodium chloride in a concentration, typically about 1.0 to 2.0 weight percent, which will promote the desired low interfacial tension between the injected water and the reservoir oil. The subsequently injected thickened water slug contains a viscosifier such as a water-soluble biopolymer in a graded concentration in order to provide an initial viscosity greater than the viscosity of the reservoir oil and a terminal viscosity near that of water. Thereafter a driving fluid such as produced field brine is injected in order to carry the process to conclusion.

Another waterflooding procedure, in which surfactants are formed in situ, involves alkaline waterflooding. In this process an aqueous solution of an alkali metal or ammonium hydroxide or carbonate is injected in order to neutralize indigenous or added organic acids in the reservoir oil to produce the corresponding alkali metal or ammonium salts. Alkaline waterflooding has been proposed in order to lower the interfacial tension between the reservoir oil and the injected water, to alter or even reverse the wettability of the reservoir, e.g., from oil-wet to water-wet, or for the purpose of mobility control by the formation of a relatively viscous oil and water emulsion.

Alkaline waterflooding has been the subject of numerous articles and patents. For example, a paper by R. J. Cooper, "The Effect of Temperature on Caustic Displacement of Crude Oil", SPE Paper No. 3685, AIME, 1971, describes various laboratory tests carried out to determine the effect of temperature and sodium hydroxide concentration on oil displacement. The concentrations reported in the Cooper paper were within the range of 0.001 to 1.0 weight percent sodium hydroxide. The author concludes that a sodium hydroxide concentration within the range of 0.08 to 0.30 weight percent, which reduces the oil-water interfacial tension to a value below 0.1 dyne per centimeter, is preferred. The displacement tests indicate that the greatest recovery is achieved when employing a solution of 0.2 weight percent sodium hydroxide at a temperature of 160°F.

Another article by Reisberg et al., "Interfacial Phenomena in Crude-Oil-Water Systems", PRODUCERS MONTHLY, Vol. 21, Nov. 1956, examines the effect of sodium hydroxide concentration on core displacement tests and upon oil-water interfacial tensions, and also considers the effect of adding commercially available nonionic surfactants or inorganic salts to the sodium hydroxide solution. Reisberg et al. observe that a minimum interfacial tension of 0.02 dyne per centimeter occurs at a sodium hydroxide concentration of 0.5 weight percent and further note at sodium hydroxide concentrations below this level the interfacial tension may be lowered to values of less than 0.01 dyne per centimeter by the addition of salt. In FIG. 13 and the attendant text of this article the authors illustrate the results achieved in core displacement tests employing a neutral brine containing 2.5 percent sodium chloride, an alkaline brine containing 2.5 percent sodium chloride and 1.0 percent sodium hydroxide, and an alkaline surfactant brine containing 2.5 percent sodium chloride, 1.0 percent sodium hydroxide, and 0.5 percent of an anionic surfactant. The authors conclude that an increase in oil recovery appears not to be observed until the effluent is alkaline and that a reduction in oil-water interfacial tension alone is not sufficient to cause a large decrease in residual oil saturation for certain crude oils.

U.S. Pat. No. 3,111,984 to Reisberg also discloses an alkaline waterflood process in which a solution of organic acids is first injected into the formation followed by an aqueous alkaline slug which may contain a viscosity enhancing additive. The patentee notes that the sodium hydroxide concentration may range from lows of 0.01–0.02 or 0.05 percent to "about 1%, or even several percent". The preferred sodium hydroxide concentration is said to be on the order of about 0.1 percent. The patentee suggests that the alkaline solution be injected in amounts within the range of about two pore volumes to 10 or 15 pore volumes. Where the amount of alkaline solution is near the lower end of this limit, e.g., two or three pore volumes, the patentee teaches that a somewhat high alkali concentration should be employed.

In U.S. Pat. No. 3,251,412 to Cooke et al. it is proposed that the pH and salinity of an alkaline displacement medium be adjusted in order to arrive at a desired low interfacial tension and preferential oil-wetting of the reservoir rocks. This patent discloses an alkaline flood in which water injection is halted for a time to allow reservoir oil to migrate into the upper portion of the formation. The patentees propose that the pH be adjusted within the range of 8 to 13, preferably 9.5 to 12.5, by the addition of weak bases and acids and that the salinity of the alkaline water be within the range of 0.6 to 5.0 N, preferably 0.6 to 3.0 N.

A further modification of the basic alkaline waterflooding technique is found in U.S. Pat. No. 3,344,858 to Gilchrist et al. This patent is directed to a recovery process in which an alkaline slug is injected first and then followed by a hydrocarbon slug containing organic acids which are neutralized in situ. The alkali concentration in the aqueous alkaline slug is within the range of 0.001 to 1.25 weight percent, with 0.1 weight percent generally being preferred, and the slug size is within the range of 0.01 to 0.2 pore volume.

Three recent papers on the subject of alkaline waterflooding were presented at the Improved Oil Recovery Symposium of the Society of Petroleum Engineers of AIME held at Tulsa, Oklahoma, April 22–24, 1974.

One paper, Cooke et al., "Oil Recovery by Alkaline Waterflooding", SPE Paper No. 4739, examines the effect of alkaline waterflooding in reversing the wettability of the formation from water-wet to oil-wet. Data presented by the authors indicate that for various saline alkaline water systems, minimum residual oil saturation may occur at about 4 to 7 percent sodium chloride in one set of tests involving a synthetic oil, and about 6 to 12 percent sodium chloride in another set of tests involving a crude oil.

Another paper, Jennings et al., "A Caustic Waterflooding Process for Heavy Oils", SPE Paper No. 4741, discusses, as an alternative to wettability reversal, a mechanism which is said to involve a drastic reduction in oil-water interfacial tension which in turn leads to in situ emulsification and water mobility reduction. The authors present data showing that by adding 22,000 ppm (2.2 weight percent) sodium chloride to the alkaline water the sodium hydroxide concentration associated with the "optimum" low interfacial tension is within the range of about 0.005 to 0.010 weight percent compared to about 0.10 weight percent sodium hydroxide for distilled water. The authors then conclude that the addition of salt to reduce caustic concentration is not economically practical.

The third paper, Graue et al., "Field Trial of Caustic Flooding Process", SPE Paper No. 4740, describes an alkaline waterflood field test which was carried out apparently based on data presented in the Jennings et al. paper.

Summary of the Invention

In accordance with the present invention, there is provided a new and improved alkaline waterflooding process in which the pH and salinity of the aqueous alkaline solution are controlled in relatively narrow ranges which result in low oil-water interfacial tensions which enhance the microscopic displacement of oil from the interstices of the reservoir rock. The invention is practiced in a subterranean oil reservoir which is penetrated by spaced injection and production systems and which contains oil having an acid number of at least 0.167. In carrying out the invention, there is injected into the reservoir via the injection system an aqueous alkaline solution in an amount within the range of 0.15 to 0.65 pore volume. The alkaline solution has an alkali concentation to impart a solution pH within the range of 11.5 to 13 and a monovalent salt salinity within the range of 0.5 to 2.0 weight percent. Subsequent to the injection of the aqueous alkaline solution, a driving fluid which may be available field water is injected into the injection system in order to displace oil within the reservoir to the production system from which it is recovered. The alkaline agent preferred in carrying out the invention is an alkali metal hydroxide, desirably sodium hydroxide, which is present in a concentration of from 0.005 to 0.1 N. Sodium chloride preferably is employed to control the salinity within the desired range.

In a further embodiment of the invention, the alkaline solution comprises two successively injected slugs, the first an initiation slug which is of a relatively low viscosity, and the second a mobility control slug which is of a somewhat higher viscosity to provide for increased sweep efficiency. Preferably the initiation slug is injected in an amount within the range of 0.05 to 0.15 pore volume and the subsequent mobility control slug is injected in an amount within the range of 0.1 to 0.5 pore volume.

The viscosity of the mobility control slug may be adjusted to a level near or in excess of the viscosity of the reservoir oil by the addition of a suitable thickening agent. Preferably at least a portion of the mobility control slug will exhibit a viscosity within the range of 1 to 4 times the viscosity of the reservoir oil. It usually will be desirable to progressively decrease the concentration of the thickening agent in the slug so that the viscosity of the latter portion of the slug is graded downwardly to a value near that of the subsequently injected driving fluid, typically field water. The mobility control slug is then followed by the driving fluid in order to carry the process to its completion.

DESCRIPTION OF SPECIFIC EMBODIMENTS

Figure 1:
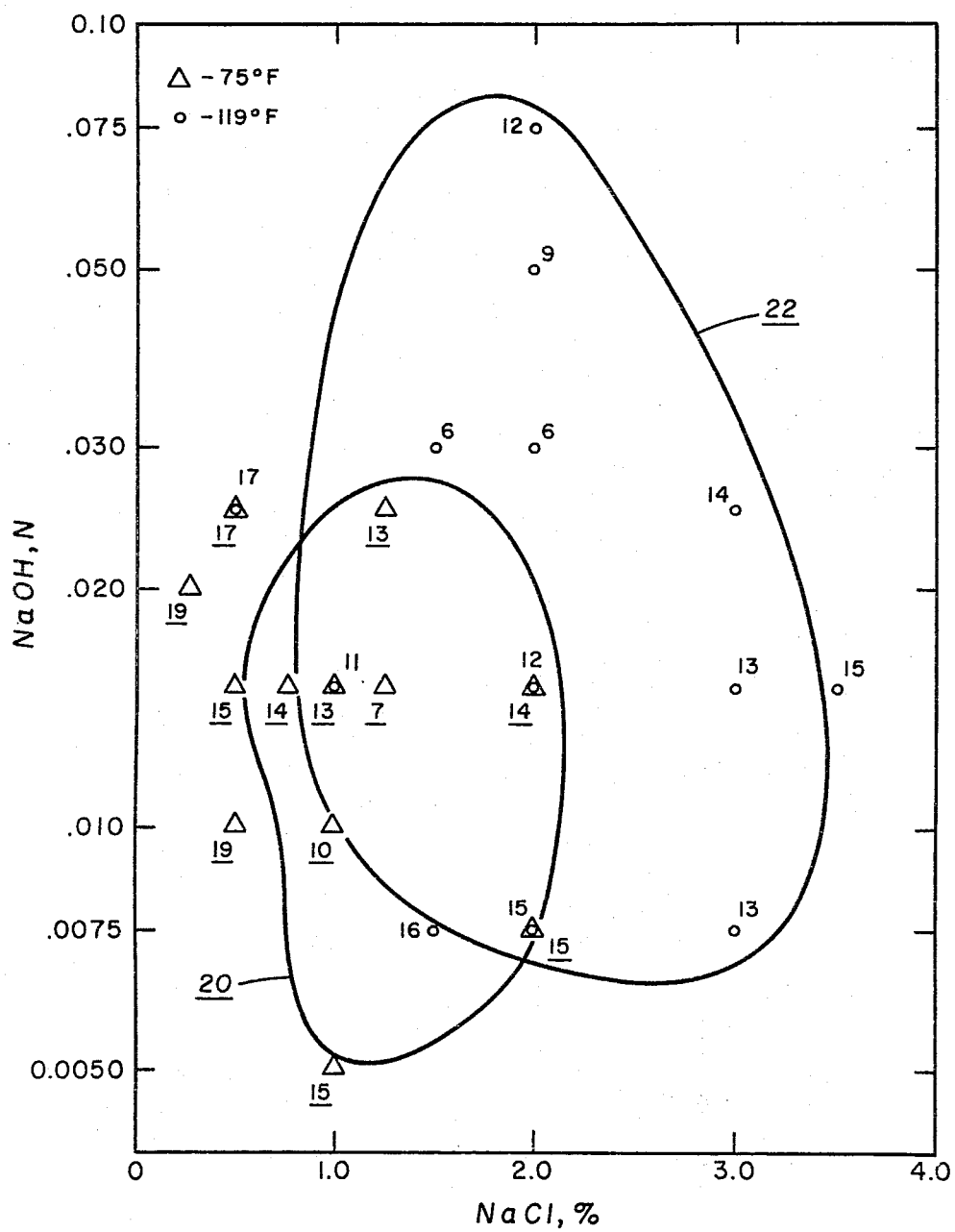
FIGS. 1 through 3 are oil recovery maps illustrating oil displacement in terms of residual oil saturation or percent oil recovery at different concentrations in the aqueous phase of sodium chloride and sodium hydroxide.

As noted previously, it has been suggested that alkaline waterflooding may involve different but interrelated recovery mechanisms: interfacial tension reduction, wettability alteration, and emulsification. That aqueous phase salinity may have an effect on the surface forces involved in such mechanisms has long been recognized by surface chemists and some investigators of alkaline waterflooding have related the salinity of the aqueous displacing medium to oil displacement efficiency. For example, the aforementioned paper by Reisberg et al. refers to work by Harkins and Zollman, "Interfacial Tension in Emulsification. I. The Effects of Bases, Salts, and Acids Upon the Interfacial Tension Between Aqueous Sodium Oleate Solutions and Benzene. II. Extremely Small Interfacial Tensions Produced by Solutes", JOURNAL AMERICAN CHEM. SOCIETY, Vol. 48, Jan. 1926, which indicates that extremely low interfacial tensions in aqueous solutions of sodium oleate and various oils can be achieved by adding 0.15 normal sodium chloride. Reisberg et al. allude to a similar effect in their work although they do not indicate concentrations of sodium chloride other than in a displacement test employing 2.5 percent sodium chloride and 1.0 percent sodium hydroxide. The authors go on to conclude that oil-water interfacial tension reduction alone may not be the primary governing factor but that oil-solid and water-solid interfacial tensions may be of equal or greater importance.

To the extent that the prior art has attempted to quantitize the desired salinity of the aqueous phase in alkaline waterflooding, it would appear in the main to teach that relatively high salinities should be used, perhaps because emphasis is placed on wettability considerations. For example, the aforementioned patent to Cooke et al. places emphasis upon low interfacial tension and preferential oil-wetting and suggests a minimum salinity of about 0.6 N (about 3.5 weight percent for sodium chloride) to achieve preferential oil-wetting of rocks. The aforementioned article by Cooke et al. which also stresses wettability alteration suggests that even higher sodium chloride concentrations should be used. The Jennings et al. paper cited previously states that a 2.2 weight percent of sodium chloride in the alkaline solution is associated with a sodium hydroxide concentration of about 0.010 weight percent or less for low interfacial tensions which promote an emulsification mechanism. This paper reports somewhat similar results with about 0.10 weight percent sodium hydroxide in distilled water and the authors suggest that this formulation be used. Thus the prior art as exemplified by these references while alluding to the effect of salinity on interfacial tension suggests that the salinity should be relatively high from the standpoint of wettability alteration or quite low (distilled water) when emphasis is placed upon emulsification as an alternative to wettability alteration.

The present invention involves the use of an aqueous alkaline medium in which the salinity and alkalinity are controlled within defined ranges to provide for low oil-water interfacial tensions which increase the microscopic displacement efficiency of the water. It is believed that in alkaline waterflooding some or all of the above identified mechanisms of interfacial tension reduction, emulsification, and wettability alteration are present and that their contributions to oil displacement depend upon the character of the crude oil within the reservoir, and in particular the nature of the organic acids indigenous to the crude oil. These acids may be classified as low molecular weight acids, intermediate molecular weight acids which occur in resin fractions, and high molecular weight acids which occur in asphaltene fractions.

The asphaltene fraction is defined as that petroleum fraction which at room temperature is soluble in benzene but not soluble in normal pentane, as set forth more fully by Erdman, J. G., "American Society Testing Materials", Special Technical Publication No. 389, p. 265 (1965). The resins on the other hand are the petroleum fraction which at room temperature is soluble in normal pentane but not in propane, as set forth in Dickie, J. P. et al., "Electron Microscopic Investigations on the Nature of Petroleum Asphaltics", JOUR. COLL. INTER. SCI., Vol. 29, p. 475 (1969). The high and intermediate molecular weight acids found in the asphaltene and resin fractions may be isolated by precipitation in normal pentane and propane, respectively. In excess of 90 percent of the total titratable acids, including the higher, intermediate and lower molecular weight acids, may be isolated from the crude oil by multistage extraction employing one percent by weight sodium hydroxide in a water-ethanol mixture containing 70 percent by volume ethanol. The low molecular weight acids exhibit a molecular weight in the acid form within the range of approximately 300 to 500. The intermediate molecular weight acids fall within the range of about 500 to 1000, and the high molecular weight acids exhibit molecular weights of more than 1000.

In addition to the molecular weight distribution of the organic acids within the crude oil, the total acid content of the crude oil is also significant. The total acid content of the crude oil is commonly measured by the "acid number" which is defined as the milligrams of potassium hydroxide required to neutralize the acids in one gram of crude oil in a nonaqueous type titration.

The interfacial tension reduction mechanism is present regardless of the molecular weight classification of the acids in the reservoir oil and this mechanism is particularly prominent where significant quantities of the lower molecular weight acids are present. The emulsification mechanism is likewise present and appears to become more significant as the resin and asphaltene content of the reservoir oil increases. The wettability alteration mechanism appears to have little effect on the oil displacement efficiency for those crude oils which are high in resin content and relatively low in asphaltene content. On the other hand, it is believed that wettability alteration plays an important role in the displacement of crude oils which are high in asphaltenes.

While the present invention is not to be limited by theory, it is postulated that at the alkalinity range employed in the present invention the salinity concentration employed leads to optimum or near optimum low oil-water interfacial tensions without significantly impairing the other oil recovery mechanisms, i.e., emulsification and wettability alteration, which also may be operative. On the other hand, while the wettability alteration mechanism may be enhanced by the somewhat higher salinity concentrations generally proposed by the prior art, the improvement in this mechanism would appear to be more than offset by the deleterious effect on the interfacial tension mechanism.

To demonstrate the effect of salinity and alkali concentration on the oil displacement efficiency of alkaline waterflooding, laboratory displacement experiments were carried out on a number of crude oils. The linear displacement experiments were performed in 3-foot long flow tubes exhibiting an inside diameter of ¼ inch and packed with unconsolidated sand.

The crude oils tested were not altered except for those which were extremely viscous or contained suspended water. In the latter case, such crude oils were subject to high speed centrifuging and vacuum filtration in order to remove the water droplets. Those which were too viscous to be used in the laboratory displacement tests were diluted with a refined oil of the type available from the Witco Chemical Company under the trade name "Klearol".

In each tube run, the tube was packed with unconsolidated sand and then saturated with saline water with the amount of water necessary to saturate the tube being measured to determine the total pore volume of the tube. The reservoir oil under investigation was then flooded into the tube until the effluent from the tube contained no water. The total amount of water displaced from the tube during this operation was measured in order to determine initial oil saturation.

The alkaline displacement tests were carried out either as secondary or tertiary processes. In the former case, the alkaline waterflood was carried out with the tube test. In addition, Table I presents the acid numbers of the crude oils under investigation, the residual oil saturation in the tube runs after polymer displacement (without an alkaline agent), and the residual oil saturation in the tubes after alkaline displacement. The efficacy of the alkaline displacement process with respect to the particular crude oil is presented in the column which sets forth the ratio "R" of the residual oil remaining after alkaline flood to the residual oil remaining after polymer flood. In addition, columns 3 and 4 give the distribution of acids, in terms of percent of total acids present in the oil, in the asphaltene and resin fractions of oils Nos. 1, 4, 5, 11, 14, and 16. Acid distribution analyses were not carried out on the remaining crude oils.

TABLE I

| Oil | Acid No. | Acid Distribution % Asphaltenes | Resins | $(S_{or})p$ | $(S_{or})a$ | R | Opt.Chem. Conc. in Disp. Slug NaCl,% | NaOH,N | pH | Kelzan,ppm |
|---|---|---|---|---|---|---|---|---|---|---|
| 1 | 1.908a | 47.42 | 51.30 | 22.0 | 0.0 | 0.000 | 1.0 | 0.0500 | 12.7 | 2000 |
| 2 | 1.620a | | | 19.0 | 0.0 | 0.000 | 1.0 | 0.0100 | 12.0 | 1250 |
| 3 | 1.500 | | | 30.0 | 11.8 | 0.394 | 1.0 | 0.0100 | 12.0 | — |
| 4 | 1.100 | 39.69 | 5.82 | 10.3 | 3.1 | 0.301 | 4.0 | 0.0010 | 11.0 | 1500 |
| 5 | 0.883 | trace | 89.98 | 19.1 | 5.3 | 0.278 | 1.5 | 0.0300 | 12.5 | 1000 |
| 6 | 0.691 | | | 22.8 | 14.7 | 0.645 | 1.5 | 0.0400 | 12.6 | 1500 |
| 7 | 0.634 | | | 20.5 | 15.8 | 0.771 | 1.5 | 0.0300 | 12.5 | 1500 |
| 8 | 0.536 | | | 16.8 | 9.8 | 0.583 | 1.5 | 0.0500 | 12.7 | 750 |
| 9 | 0.407 | | | 19.1 | 15.1 | 0.791 | 0.5 | 0.0100 | 12.0 | 2000 |
| 10 | 0.345 | | | 21.0 | 18.6 | 0.886 | 1.0 | 0.0100 | 12.0 | 750 |
| 11 | 0.317 | 9.07 | 77.22 | 22.5 | 17.8 | 0.791 | 1.0 | 0.0100 | 12.0 | 750 |
| 12 | 0.305 | | | 20.5 | 16.7 | 0.815 | 1.5 | 0.0250 | 12.4 | 750 |
| 13 | 0.286 | | | 21.7 | 15.8 | 0.728 | 0.5 | 0.0100 | 12.0 | 1000 |
| 14 | 0.208 | 8.80 | 51.60 | 20.4 | 18.7 | 0.917 | 1.0 | 0.0100 | 12.0 | 500 |
| 15 | 0.195 | | | 20.4 | 15.7 | 0.770 | 1.0 | 0.0350 | 12.6 | 500 |
| 16 | 0.167 | 17.53 | 40.66 | 17.7 | 13.3 | 0.806 | 0.5 | 0.0075 | 11.8 | 1500 |

Footnotes for Table I
$(S_{or})p$: Residual oil saturation at conclusion of polymer flood
$(S_{or})a$: Residual oil saturation at conclusion of alkaline flood
R: Ratio of $(S_{or})a$ to $(S_{or})p$
a: Acid number of oil as diluted for 40% Klearol tube at the initial oil saturation. Where the alkaline waterflood was carried out as a tertiary process, an ordinary waterflood or a polymer waterflood was first carried out. The polymer used in the laboratory experiments was the ionic polysaccharide B-1459 produced by fermentation of glucose with the bacterium *Xanthomonas campestris* NRRL B-1459, USDA, and available from the Kelco Chemical Company under the trade name "Kelzan". The amount of Kelzan employed was such as to adjust the viscosity of the displacement liquid to a value equal to or in excess of the oil within the tube. In most tube runs, the Kelzan concentration was within the range of 500 to 2,000 parts per million (ppm).

The alkaline displacement tests were carried out employing sodium chloride as the salinity control agent and, in most cases, sodium hydroxide as the alkaline agent. Kelzan was used in a portion of the alkaline displacement tests as a mobility control agent. In some cases, the Kelzan was present in all of the alkaline solution injected, and in other cases an initial aqueous slug containing an alkaline agent and/or salt was injected without Kelzan, and this slug was then followed with an aqueous slug of alkaline agent, sodium chloride, and Kelzan.

The results of the alkaline displacement tube tests as carried out on 16 crude oils are summarized in Table I. Table I set forth the salinity in terms of the weight percent of sodium chloride in solution and the alkalinity expressed as the pH of the solution and the normality of sodium hydroxide which were found to yield the maximum oil displacement in the alkaline displacement From an examination of the information presented in Table I, it can be seen that for all of the crude oils but one (crude oil No. 4) the optimum sodium chloride concentration was found to fall within the range of 0.5 to 2.0 weight percent sodium chloride and the optimum alkalinity was found to fall within the range of 0.005 to 0.1 N sodium hydroxide and a pH of 11.5 to 13.0.

Upon reviewing the data presented in columns 3 and 4 of Table I, it will be noted that for crude oil No. 4 most of the identifiable acids were the high molecular weight acids found in the asphaltene fraction with only a small amount of intermediate molecular weight acids found in the resin fraction. It is possible that the most effective displacement for crude oil No. 4 occurred at a relatively high salinity because of this relatively high asphaltene content which tended to promote the wettability alteration mechanism as the primary oil recovery mechanism. However, as will become apparent from data presented hereinafter, a very low residual oil saturation for crude oil No. 4 was also observed when operating at a salinity within the range of 0.5 to 2.0 weight percent sodium chloride.

The data presented in summary form in Table I were obtained in some instances from "screening tests" in which only a few data points were collected and in other instances from more comprehensive tests which involved a fairly large number of data points. More detailed tabulations of the results obtained by the displacement tests carried out with respect to oils 1 through 16 are presented respectively in Tables II through XVII. In Tables II through XVII the results of the various displacement tests are presented in terms of the percentage of original oil recovered from the tubes and also in terms of the absolute percent residual oil saturation remaining at the conclusion of the alkaline displacement tests since both of these values are considered to be an indication of the efficiency of the displacement process.

TABLE II

| Run No. | $S_{or}$,% | Recovery % | Fluid PV | NaCl,% | Additives NaOH,N | Kelzan,ppm |
|---|---|---|---|---|---|---|
| 1 | 11.92 | 84.90 | 2.67 | 0.5 | 0.0075 | 2000 |
| 2 | 4.55 | 94.27 | 2.25 | 0.5 | 0.0200 | 2000 |
| 3 | 11.08 | 80.50 | 1.93 | 0.5 | 0.0500 | 2000 |
| 4 | 31.12 | 60.10 | 3.18 | 1.0 | 0 | 0 |
| 5 | 21.98 | 71.70 | 1.20 | 1.0 | 0 | 2000 |
| 6 | 22.66 | 71.17 | 1.20 | 1.0 | 0.0010 | 2000 |
| 7 | 11.77 | 84.65 | 1.53 | 1.0 | 0.0050 | 2000 |
| 8 | 0.00 | 100.00 | 3.50 | 1.0 | 0.0075 | 2000 |
| 9 | 0.00 | 100.00 | 2.91 | 1.0 | 0.0100 | 2000 |
| 10 | 0.00 | 100.00 | 2.35 | 1.0 | 0.0150 | 2000 |
| 11 | 0.00 | 100.00 | 2.01 | 1.0 | 0.0200 | 2000 |
| 12 | 0.00 | 100.00 | 1.55 | 1.0 | 0.0400 | 2000 |
| 13 | 0.00 | 100.00 | 1.41 | 1.0 | 0.0500 | 2000 |
| 14 | 0.00 | 100.00 | 1.61 | 1.0 | 0.0500 | 2000 |
| 15 | 3.64 | 95.45 | 1.50 | 1.0 | 0.0750 | 2000 |
| 16 | 14.78 | 81.04 | 1.20 | 1.0 | 0.2000 | 2000 |
| 17 | 5.83 | 92.60 | 1.73 | 1.5 | 0.0200 | 2000 |
| 18 | 6.88 | 91.30 | 1.62 | 1.5 | 0.0500 | 2000 |
| 19 | 13.87 | 82.50 | 2.45 | 2.0 | 0.0050 | 2000 |
| 20 | 8.90 | 88.90 | 1.77 | 2.0 | 0.0200 | 2000 |

Runs 1–13, 15–20 at 75° F.
Run 14 at 135° F.

TABLE III

| Run No. | $S_{or}$,% | Recovery % | Fluid PV | NaCl % | NaOH N | Additives KOH N | $NH_4OH$ N | Kelzan ppm |
|---|---|---|---|---|---|---|---|---|
| 1 | 24.8 | 67.00 | 3.0 | 0.5 | | | | 0 |
| 2 | 22.5 | 70.00 | 3.0 | 1.0 | | | | 0 |
| 3 | 23.3 | 69.00 | 3.0 | 2.0 | | | | 0 |
| 4 | 26.3 | 65.00 | 3.0 | c | | | | 0 |
| 5 | 18.8 | 75.00 | 1.5 | 1.0 | | | | 1250 |
| 6 | 18.8 | 75.00 | 1.7 | 1.0 | 0.0025 | | | 1250 |
| 7 | 0 | 100.00 | 3.4 | 1.0 | 0.0050 | | | 0 |
| 8 | 0 | 100.00 | 2.9 | 1.0 | 0.0075 | | | 1250 |
| 9* | | | 0.5 | 1.0 | 0.0075 | | | 0 |
| | 0 | 100.00 | 2.7 | 1.0 | 0.0075 | | | 1250 |
| 10* | | | 0.5 | 1.0 | 0.0100 | | | 0 |
| | 0 | 100.00 | 2.6 | 1.0 | 0.0075 | | | 1250 |
| 11* | | | 0.5 | 1.0 | | | 0.25 | 0 |
| | 16.6 | 78.00 | 1.3 | 1.0 | | | 0 | 1250 |
| 12* | | | 0.5 | 1.0 | | | 0.50 | 0 |
| | 14.7 | 80.00 | 2.0 | 1.0 | | | 0 | 1250 |
| 13* | | | 0.5 | 1.0 | | | 0.50 | 0 |
| | 7.6 | 90.00 | 1.7 | 1.0 | | | 0.50 | 1250 |
| 14* | | | 0.5 | 1.0 | | | 0.50 | 0 |
| | 9.8 | 87.00 | 1.6 | 1.0 | | | 0.50 | 1250 |
| 15* | | | 0.5 | 1.0 | | | 1.00 | 0 |
| | 10.3 | 86.00 | 1.6 | 1.0 | | | 1.00 | 1250 |
| 16* | | | 0.5 | 1.0 | | | 2.00 | 0 |
| | 14.5 | 81.00 | 2.0 | 1.0 | | | | 1250 |
| 17* | | | 0.5 | 1.0 | | 0.0075 | | 0 |
| | 2.5 | 97.00 | 2.8 | 1.0 | | 0.0075 | | 1250 |

Runs 1–13, 15–17 at 75° F.
Run 14 at 141° F.
c: Approximately 2.7% NaCl with other dissolved solids.
*Two slug process.

TABLE IV

| Run No. | $S_{or}$,% | Recovery % | Fluid PV | NaCl % | Additives NaOH N | pH | Kelzan ppm |
|---|---|---|---|---|---|---|---|
| 1 | 33.2 | 57.3 | 3.6 | 1.0 | 0 | | 0 |
| 2 | 27.4 | 65.5 | 3.4 | 0.5 | 0.010 | | 0 |
| 3 | 32.0 | 58.9 | 3.5 | 1.0 | 0.005 | 11.60 | 0 |
| 4 | 15.0 | 81.0 | 3.3 | 1.0 | 0.010 | 11.97 | 0 |
| 5 | 15.2 | 80.5 | 3.4 | 1.0 | 0.010 | 12.05 | 0 |
| 6 | 13.2 | 83.5 | 4.0 | 1.0 | 0.010 | 12.05 | 0 |
| 7 | 19.4 | 75.6 | 2.9 | 1.0 | 0.010 | | 0 |
| 8 | 5.9 | 92.7 | 3.2 | 1.0 | 0.010 | 11.96 | 1000 |
| 9 | 19.6 | 75.0 | 3.1 | 1.0 | 0.020 | 12.37 | 0 |
| 10 | 23.2 | 70.6 | 3.3 | 1.0 | 0.030 | 12.52 | 0 |
| 11 | 14.5 | 82.0 | 3.0 | 1.0 | 0.030 | 12.56 | 0 |
| 12 | 20.2 | 74.7 | 3.7 | 1.5 | 0.010 | 11.97 | 0 |
| 13 | 19.3 | 75.6 | 2.8 | 1.5 | 0.020 | 12.25 | 0 |
| 14 | 26.3 | 66.7 | 3.0 | 2.0 | 0.010 | 12.04 | 0 |

TABLE IV-continued

| Run No. | $S_{or}$,% | Recovery % | Fluid PV | NaCl % | Additives NaOH N | pH | Kelzan ppm |
|---|---|---|---|---|---|---|---|
| 15 | 29.95 | 62.56 | 2.73 | 1.0 | 0 | | 0 |
| 16 | 11.81 | 85.23 | 3.73 | 1.0 | 0.010 | 12.00 | 0 |

Runs 1–5, 7, 9, 10, and 14 at 75° F.
Runs 6, 8, 11–13, 15 and 16 at 135° F.

TABLE V

| Run No. | $S_{or}$,% | Recovery % | Fluid PV | NaCl % | Additives NaOH N | pH | Kelzan ppm |
|---|---|---|---|---|---|---|---|
| 1 | 4.22 | 94.32 | 2.62 | 0.5 | 0.0010 | 11.0 | 1500 |
| 2 | 8.30 | 89.00 | 1.90 | 0.5 | 0.0050 | 11.7 | 1500 |
| 3 | 7.41 | 90.00 | 2.08 | 0.5 | 0.0100 | 12.0 | 1500 |
| 4 | 7.42 | 90.00 | 2.05 | 1.0 | 0.0005 | 10.7 | 1500 |
| 5 | 3.90 | 94.77 | 2.45 | 1.0 | 0.0010 | 11.0 | 1500 |
| 6 | 7.02 | 90.70 | 1.94 | 1.0 | 0.0025 | 11.4 | 1500 |
| 7 | 7.20 | 90.30 | 1.74 | 1.0 | 0.0050 | 11.7 | 1500 |
| 8 | 8.66 | 88.50 | 2.00 | 1.0 | 0.0100 | 12.0 | 1500 |
| 9 | 10.50 | 86.00 | 1.69 | 1.0 | 0.0200 | 12.3 | 1500 |
| 10 | 7.00 | 90.50 | 2.23 | 1.5 | 0.0050 | 11.7 | 1500 |
| 11 | 11.45 | 84.70 | 2.00 | 1.5 | 0.0100 | 12.0 | 1500 |
| 12 | 10.23 | 86.20 | 1.65 | 1.5 | 0.0200 | 12.3 | 1500 |
| 13 | 6.36 | 91.50 | 2.12 | 2.0 | 0.0005 | 10.7 | 1500 |
| 14 | 5.60 | 92.40 | 2.30 | 2.0 | 0.0010 | 11.0 | 1500 |
| 15 | 6.55 | 91.20 | 2.18 | 2.0 | 0.0025 | 11.4 | 1500 |
| 16 | 3.57 | 95.10 | 2.12 | 2.0 | 0.0010 | 11.0 | 1500 |
| 17 | 3.13 | 95.80 | 2.36 | 4.0 | 0.0010 | 11.0 | 1500 |
| 18 | 3.54 | 95.23 | 5.0 | 0.0010 | | 11.0 | 1500 |
| 19 | 23.93 | 67.40 | 3.08 | 4.0 | 0.0010 | 11.0 | 0 |
| 20 | 10.27 | 86.50 | 1.99 | 1.0 | 0 | | 1500 |

Runs 1–20 at 75° F.

TABLE VI(a)

| Run No. | $S_{or}$,% | Recovery % | Fluid PV | NaCl % | Additives NaOH N | Kelzan ppm |
|---|---|---|---|---|---|---|
| 1 | 19.33 | 74.73 | 1.09 | 0.25 | 0.0200 | 1500 |
| 2 | 19.07 | 74.73 | 1.00 | 0.50 | 0.0100 | 1500 |
| 3 | 14.76 | 80.11 | 2.00 | 0.50 | 0.0150 | 1500 |
| 4 | 17.25 | 76.98 | 1.69 | 0.50 | 0.0250 | 1500 |
| 5 | 13.87 | 81.52 | 2.10 | 0.75 | 0.0150 | 1500 |
| 6 | 24.46 | 67.58 | 3.40 | 1.00 | 0.0000 | 0 |
| 7 | 19.26 | 74.47 | 1.36 | 1.00 | 0.0000 | 1500 |
| 8 | 15.40 | 79.59 | 1.57 | 1.00 | 0.0050 | 1500 |
| 9 | 10.37 | 86.02 | 2.58 | 1.00 | 0.0100 | 1500 |
| 10 | 10.36 | 86.11 | 2.83 | 1.00 | 0.0100 | 1000 |
| 11 | 9.70 | 86.93 | 2.07 | 1.00 | 0.0150 | 1500 |
| 12 | 16.30 | 78.30 | 2.62 | 1.00 | 0.0200 | 1500 |
| 13 | 6.53 | 91.40 | 2.10 | 1.25 | 0.0150 | 1500 |
| 14 | 12.75 | 83.10 | 1.60 | 1.25 | 0.0250 | 1500 |
| 15 | 14.91 | 80.68 | 1.73 | 2.00 | 0.0075 | 1500 |
| 16 | 13.51 | 82.00 | 1.46 | 2.00 | 0.0150 | 1500 |

Runs 1–16 at 75° F.

TABLE VI(b)

| Run No. | $S_{or}$,% | Recovery % | Fluid PV | NaCl % | Additives NaOH N | Kelzan ppm |
|---|---|---|---|---|---|---|
| 1 | 17.06 | 76.63 | 1.00 | 0.50 | 0.0250 | 1000 |
| 2 | 24.30 | 67.50 | 2.50 | 1.00 | 0.0000 | 0 |
| 3 | 18.50 | 75.60 | 1.25 | 1.00 | 0.0000 | 1500 |
| 4 | 10.92 | 84.97 | 1.34 | 1.00 | 0.0150 | 1500 |
| 5 | 9.80 | 86.80 | 1.25 | 1.25 | 0.0100 | 1000 |
| 6 | 14.30 | 82.95 | 1.71 | 1.25 | 0.0250 | 1000 |
| 7 | 15.78 | 78.31 | 1.59 | 1.50 | 0.0075 | 1500 |
| 8 | 6.06 | 92.00 | 1.72 | 1.50 | 0.0300 | 1500 |
| 9 | 14.46 | 81.46 | 2.10 | 2.00 | 0.0075 | 1500 |
| 10 | 12.10 | 83.90 | 1.54 | 2.00 | 0.0150 | 1000 |
| 11 | 6.83 | 90.45 | 1.60 | 2.00 | 0.0300 | 1500 |
| 12 | 6.25 | 91.12 | 1.52 | 2.00 | 0.0300 | 1500 |
| 13* | | | 0.30 | 2.00 | 0 | 0 |
| | 5.33 | 92.80 | 1.89 | 2.00 | 0.0300 | 1500 |
| 14 | 8.53 | 88.20 | 1.45 | 2.00 | 0.0500 | 1500 |
| 15 | 12.34 | 82.68 | 1.47 | 2.00 | 0.0750 | 1500 |
| 16 | 14.00 | 81.00 | 1.11 | 2.50 | 0.0250 | 1000 |
| 17 | 12.65 | 82.46 | 2.00 | 3.00 | 0.0075 | 1500 |
| 18 | 12.60 | 82.50 | 1.65 | 3.00 | 0.0150 | 1000 |
| 19 | 13.64 | 80.86 | 1.69 | 3.00 | 0.0250 | 1500 |
| 20 | 14.84 | 79.28 | 1.55 | 3.50 | 0.0150 | 1500 |
| 21 | 18.45 | 75.60 | 1.44 | 5.00 | 0.0150 | 1000 |

Runs 1–21 at 119° F.
*Two slug process.

TABLE VII

| Run No. | $S_{or}$,% | Recovery % | Fluid PV | NaCl % | Additives NaOH N | Kelzan ppm |
|---|---|---|---|---|---|---|
| 1 | 21.62 | 70.70 | 1.07 | 0.5 | 0.010 | 1500 |
| 2 | 28.51 | 61.70 | 1.64 | 1.0 | 0 | 0 |
| 3 | 22.80 | 69.30 | 0.97 | 1.0 | 0 | 1500 |
| 4 | 19.24 | 73.90 | 1.14 | 1.0 | 0.005 | 1500 |
| 5 | 18.78 | 74.70 | 1.24 | 1.0 | 0.010 | 1500 |
| 6 | 18.68 | 74.90 | 1.42 | 1.0 | 0.010 | 1500 |
| 7 | 20.10 | 72.80 | 0.91 | 1.0 | 0.025 | 1500 |
| 8 | 17.10 | 77.00 | 1.39 | 1.0 | 0.040 | 1500 |
| 9 | 17.96 | 75.60 | 1.57 | 1.5 | 0.010 | 1500 |
| 10 | 18.61 | 75.00 | 1.61 | 1.5 | 0.025 | 1500 |
| 11 | 14.69 | 80.00 | 1.33 | 1.5 | 0.040 | 1500 |
| 12 | 15.00 | 79.60 | 1.49 | 1.5 | 0.040 | 1500 |
| 13 | 18.10 | 75.60 | 1.77 | 1.5 | 0.060 | 1500 |
| 14 | 18.53 | 74.90 | 1.39 | 2.0 | 0.010 | 1500 |
| 15 | 20.55 | 72.30 | 1.12 | 2.0 | 0.040 | 1500 |

Runs 1–15 at 97° F.

TABLE VIII

| Run No. | $S_{or}$,% | Recovery % | Fluid PV | NaCl % | Additives NaOH N | pH | Kelzan ppm |
|---|---|---|---|---|---|---|---|
| 1 | 21.12 | 71.43 | 0.98 | 0.5 | 0.0075 | 11.67 | 1500 |
| 2 | 20.16 | 72.62 | 1.02 | 0.5 | 0.0150 | 12.06 | 1500 |
| 3 | 20.68 | 71.67 | 1.56 | 0.5 | 0.0300 | 12.41 | 1500 |
| 4 | 18.05 | 75.30 | 1.50 | 1.0 | 0.0075 | 11.72 | 1500 |
| 5 | 17.03 | 76.54 | 1.10 | 1.0 | 0.0150 | 12.04 | 1500 |
| 6 | 15.65 | 78.45 | 1.59 | 1.0 | 0.0300 | 12.45 | 1500 |
| 7 | 29.12 | 60.37 | 1.65 | 1.5 | 0 | | 0 |
| 8 | 20.52 | 71.95 | 1.04 | 1.5 | 0 | | 1250 |
| 9 | 17.87 | 75.42 | 0.96 | 1.5 | 0.0075 | 11.75 | 1500 |
| 10 | 16.05 | 78.26 | 1.56 | 1.5 | 0.0150 | 12.08 | 1500 |
| 11 | 15.76 | 78.44 | 1.60 | 1.5 | 0.0300 | 12.43 | 1500 |
| 12 | 16.31 | 77.78 | 1.50 | 1.5 | 0.0500 | 12.68 | 1500 |
| 13 | 17.71 | 75.58 | 1.49 | 2.0 | 0.0300 | 12.41 | 1500 |

Runs 1–13 at 92° F.

TABLE IX

| Run No. | $S_{or}$,% | Recovery % | Fluid PV | NaCl % | Additives NaOH N | Kelzan ppm |
|---|---|---|---|---|---|---|
| 1 | 18.13 | 74.05 | 1.50 | 1.5 | 0 | 0 |
| 2 | 16.80 | 75.00 | 1.20 | 1.5 | 0 | 750 |
| 3 | 14.15 | 79.49 | 1.60 | 1.5 | 0.030 | 750 |
| 4 | 9.77 | 85.81 | 1.58 | 1.5 | 0.050 | 750 |
| 5 | 11.58 | 82.47 | 1.40 | 1.5 | 0.075 | 750 |
| 6 | 14.69 | 77.85 | 1.36 | 1.0 | 0.030 | 750 |
| 7 | 15.25 | 78.20 | 1.50 | 2.0 | 0.030 | 750 |
| 8 | 17.10 | 75.47 | 1.20 | 2.5 | 0.030 | 750 |
| 9 | 15.27 | 77.71 | 1.54 | 1.5 | 0.020 | 750 |

Runs 1–9 at 135° F.

TABLE X

| Run No. | $S_{or}$,% | Recovery % | Fluid PV | NaCl % | Additives NaOH N | Kelzan ppm |
|---|---|---|---|---|---|---|
| 1 | 18.03 | 80.30 | 2.70 | 0.5 | 0 | 2000 |
| 2 | 19.60 | 78.70 | 2.98 | 0.5 | 0.0050 | 2000 |
| 3 | 15.80 | 82.50 | 3.93 | 0.5 | 0.0100 | 2000 |
| 4 | 15.66 | 82.20 | 2.98 | 0.5 | 0.0100 | 2500 |
| 5 | 19.13 | 77.10 | 1.28 | 0.5 | 0 | 1650 |
| 6 | 16.10 | 80.30 | 1.41 | 1.0 | 0.0075 | 2000 |
| 7 | 15.22 | 81.60 | 1.50 | 0.5 | 0.0075 | 2000 |
| 8 | 15.06 | 77.10 | 1.80 | 0.5 | 0.0100 | 2000 |

Runs 1–8 at 116° F.

TABLE XI

| Run No. | $S_{or}$,% | Recovery % | Fluid PV | NaCl % | Additives NaOH N | Kelzan ppm |
|---|---|---|---|---|---|---|
| 1 | 19.68 | 72.15 | 1.26 | 0.5 | 0.010 | 750 |
| 2 | 23.77 | 66.30 | 1.82 | 1.0 | 0 | 0 |
| 3 | 21.00 | 70.20 | 1.16 | 1.0 | 0 | 750 |
| 4 | 20.80 | 70.20 | 1.46 | 1.0 | 0.005 | 750 |
| 5 | 18.62 | 73.20 | 1.25 | 1.0 | 0.010 | 750 |
| 6 | 20.50 | 71.00 | 1.31 | 1.0 | 0.015 | 750 |
| 7 | 21.70 | 69.40 | 1.37 | 1.5 | 0.010 | 750 |

Runs 1–7 at 92° F.

TABLE XII

| Run No. | $S_{or}$,% | Recovery % | Fluid PV | NaCl % | Additives NaOH N | Kelzan ppm |
|---|---|---|---|---|---|---|
| 1 | 23.73 | 66.40 | 1.61 | 1.0 | 0 | 0 |
| 2 | 23.52 | 66.24 | 2.35 | 1.0 | 0.010 | 0 |
| 3 | 22.49 | 67.09 | 1.02 | 1.0 | 0 | 750 |
| 4 | 17.77 | 74.77 | 1.05 | 1.0 | 0.010 | 750 |
| 5 | 22.84 | 67.44 | 1.00 | 0.5 | 0.010 | 750 |
| 6 | 22.89 | 67.50 | 1.02 | 0.5 | 0.020 | 750 |
| 7 | 22.15 | 68.13 | 1.03 | 1.5 | 0.005 | 750 |
| 8 | 21.27 | 68.82 | 1.00 | 1.0 | 0.005 | 750 |

Runs 1–8 at 75° F.

TABLE XIII

| Run No. | $S_{or}$,% | Recovery % | Fluid PV | NaCl % | Additives NaOH N | Kelzan ppm |
|---|---|---|---|---|---|---|
| 1 | 18.97 | 72.39 | 1.20 | 0.5 | 0.01 | 750 |
| 2 | 26.50 | 62.40 | 2.14 | 1.0 | 0 | 0 |
| 3 | 22.50 | 68.50 | 1.98 | 1.0 | 0 | 750 |
| 4 | 20.55 | 70.35 | 1.63 | 1.0 | 0 | 750 |
| 5 | 17.43 | 73.20 | 1.53 | 1.0 | 0.005 | 750 |
| 6 | 18.64 | 73.50 | 1.47 | 1.0 | 0.010 | 750 |
| 7 | 17.47 | 74.68 | 1.59 | 1.0 | 0.050 | 750 |
| 8 | 17.32 | 74.32 | 1.44 | 1.5 | 0.005 | 750 |
| 9 | 16.94 | 74.68 | 1.04 | 1.5 | 0.010 | 750 |
| 10 | 17.56 | 74.70 | 1.65 | 1.5 | 0.025 | 750 |
| 11 | 18.65 | 73.08 | 1.57 | c | 0.025 | 750 |
| 12 | 16.65 | 75.82 | 1.72 | 1.5 | 0.025 | 750 |
| 13 | 17.92 | 74.19 | 1.51 | 1.5 | 0.050 | 750 |
| 14 | 17.56 | 74.14 | 1.56 | 2.0 | 0.010 | 750 |

Runs 1, 4–14 at 125° F.
Runs 2 and 3 at 75° F.
c: Approximately 1.4% NaCl with other dissolved solids.

TABLE XIV

| Run No. | $S_{or}$,% | Recovery % | Fluid PV | NaCl % | Additives NaOH N | Kelzan ppm |
|---|---|---|---|---|---|---|
| 1 | 18.40 | 75.60 | 1.3 | 0.25 | 0.0100 | 1000 |
| 2 | 21.74 | 71.30 | 1.3 | 0.50 | 0 | 800 |
| 3 | 18.90 | 74.10 | 1.3 | 0.50 | 0.0050 | 1000 |
| 4 | 15.78 | 78.80 | 1.3 | 0.50 | 0.0100 | 1000 |
| 5 | 18.70 | 74.70 | 1.3 | 0.50 | 0.0200 | 1000 |
| 6 | 18.80 | 75.10 | 1.3 | 0.75 | 0.0100 | 1000 |
| 7 | 26.56 | 64.20 | 1.9 | 1.00 | 0 | 0 |
| 8 | 17.51 | 76.10 | 1.3 | 1.00 | 0.0010 | 1000 |
| 9 | 17.91 | 75.50 | 1.3 | 1.00 | 0.0050 | 1000 |
| 10 | 16.72 | 77.10 | 1.3 | 1.00 | 0.0100 | 1000 |
| 11 | 18.14 | 76.00 | 1.3 | 1.00 | 0.0200 | 1000 |
| 12 | 16.45 | 77.90 | 1.3 | 1.50 | 0.0050 | 1000 |
| 13 | 18.60 | 75.00 | 1.3 | 1.50 | 0.0100 | 1000 |

Runs 1–13 at 75° F.

TABLE XV

| Run No. | $S_{or}$,% | Recovery % | Fluid PV | NaCl % | Additives NaOH N | Kelzan ppm |
|---|---|---|---|---|---|---|
| 1 | 21.10 | 69.18 | 1.00 | 0.25 | 0.005 | 500 |
| 2 | 20.41 | 69.03 | 1.00 | 0.50 | 0.005 | 500 |
| 3 | 18.73 | 71.62 | 1.02 | 1.00 | 0.010 | 500 |
| 4 | 19.65 | 70.06 | 1.04 | 1.00 | 0.005 | 500 |
| 5 | 19.62 | 70.75 | 1.06 | 1.00 | 0.020 | 500 |
| 6 | 21.13 | 68.00 | 1.03 | 1.50 | 0 | 0 |
| 7 | 20.42 | 69.48 | 1.00 | 1.50 | 0 | 500 |
| 8 | 20.41 | 69.42 | 1.05 | 1.50 | 0.005 | 500 |
| 9 | 20.25 | 69.54 | 1.05 | 1.50 | 0.010 | 500 |
| 10 | 21.68 | 67.72 | 1.01 | 1.50 | 0.020 | 500 |

Runs 1–10 at 75° F.

TABLE XVI

| Run No. | $S_{or}$,% | Recovery % | Fluid PV | NaCl % | Additives NaOH N | pH | Kelzan ppm |
|---|---|---|---|---|---|---|---|
| 1 | 18.4 | 73.6 | 1.80 | 1.0 | 0 | | 0 |
| 2 | 18.7 | 72.3 | 1.75 | c | 0.01 | 8.0 | 0 |
| 3 | 19.2 | 72.1 | 1.75 | 0.5 | 0.01 | 11.8 | 0 |
| 4 | 20.4 | 70.0 | 1.20 | d | 0 | | 500 |
| 5 | 15.7 | 77.0 | 1.40 | d | 0.035 | 11.5 | 500 |
| 6 | 12.3 | 82.0 | 1.5 | 1.5 | 0.01 | | 500 |
| 7 | 11.5 | 83.3 | 1.5 | 1.0 | 0.01 | | 500 |
| 8 | 12.8 | 81.0 | 1.5 | 0.5 | 0.01 | | 500 |
| 9 | 14.2 | 78.8 | 1.73 | 1.0 | 0 | | 500 |

Runs 1–9 at 75° F.
c: Approximately 0.6% NaCl with other dissolved solids.
d: Approximately 0.9% NaCl with other dissolved solids.

TABLE XVII

| Run No. | $S_{or}$,% | Recovery % | Fluid PV | NaCl % | Additives NaOH N | Kelzan ppm |
|---|---|---|---|---|---|---|
| 1 | 30.0 | 61.0 | 2.00 | 1.0 | 0 | 0 |
| 2 | 17.7 | 77.0 | 1.40 | 1.0 | 0 | 1500 |
| 3 | 14.3 | 81.5 | 1.40 | 0.5 | 0.0075 | 1500 |
| 4 | 18.3 | 76.1 | 1.60 | 0.5 | 0 | 1500 |
| 5 | 21.1 | 73.1 | 1.40 | 0.5 | 0.0075 | 1500 |
| 6* | | | 0.25 | 0.5 | 0 | 0 |
| | 18.9 | 76.0 | 1.30 | 0.5 | 0.0075 | 1500 |

Runs 1–6 at 75° F.
*Two slug process.

Figure 2:
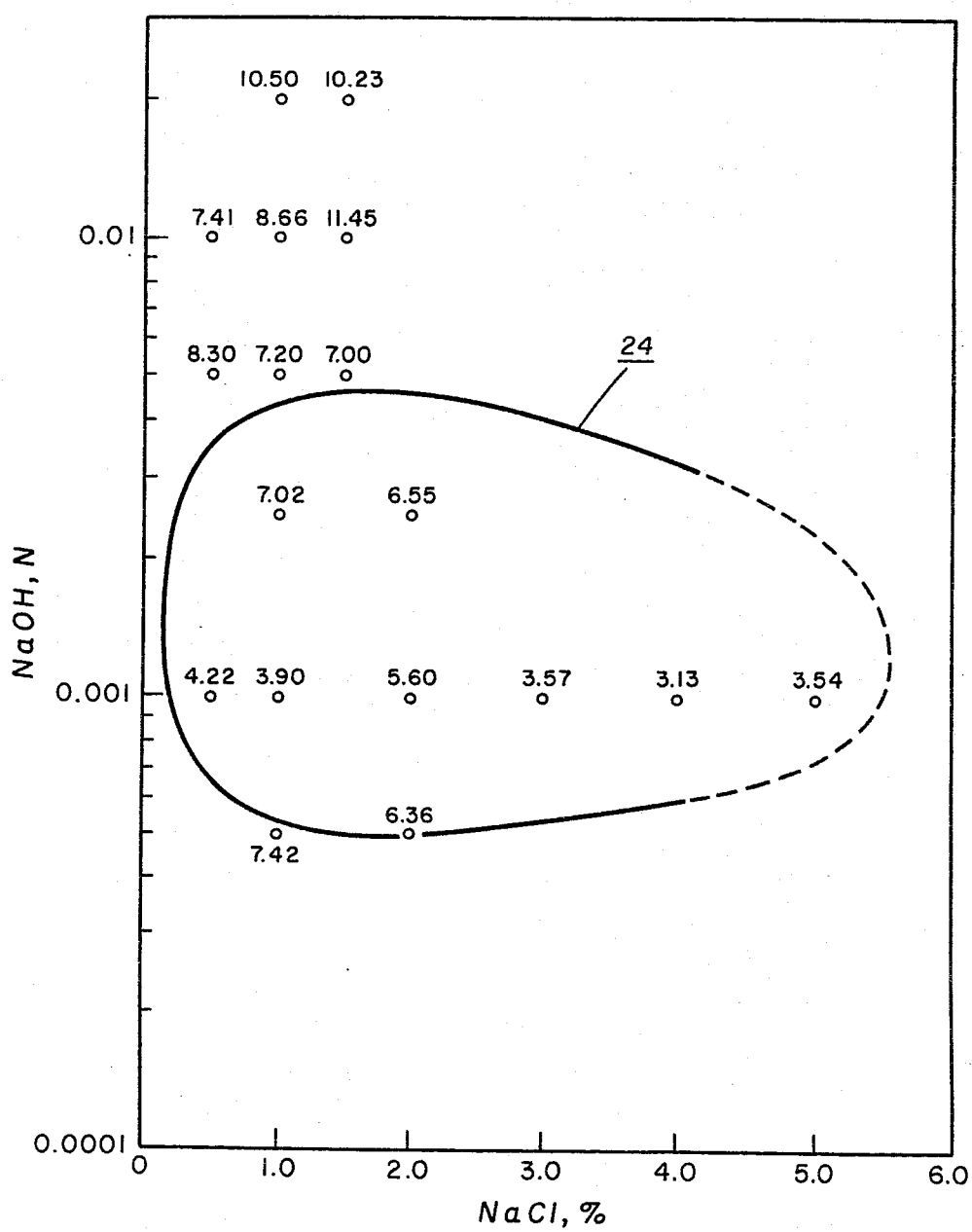
Figure 3:
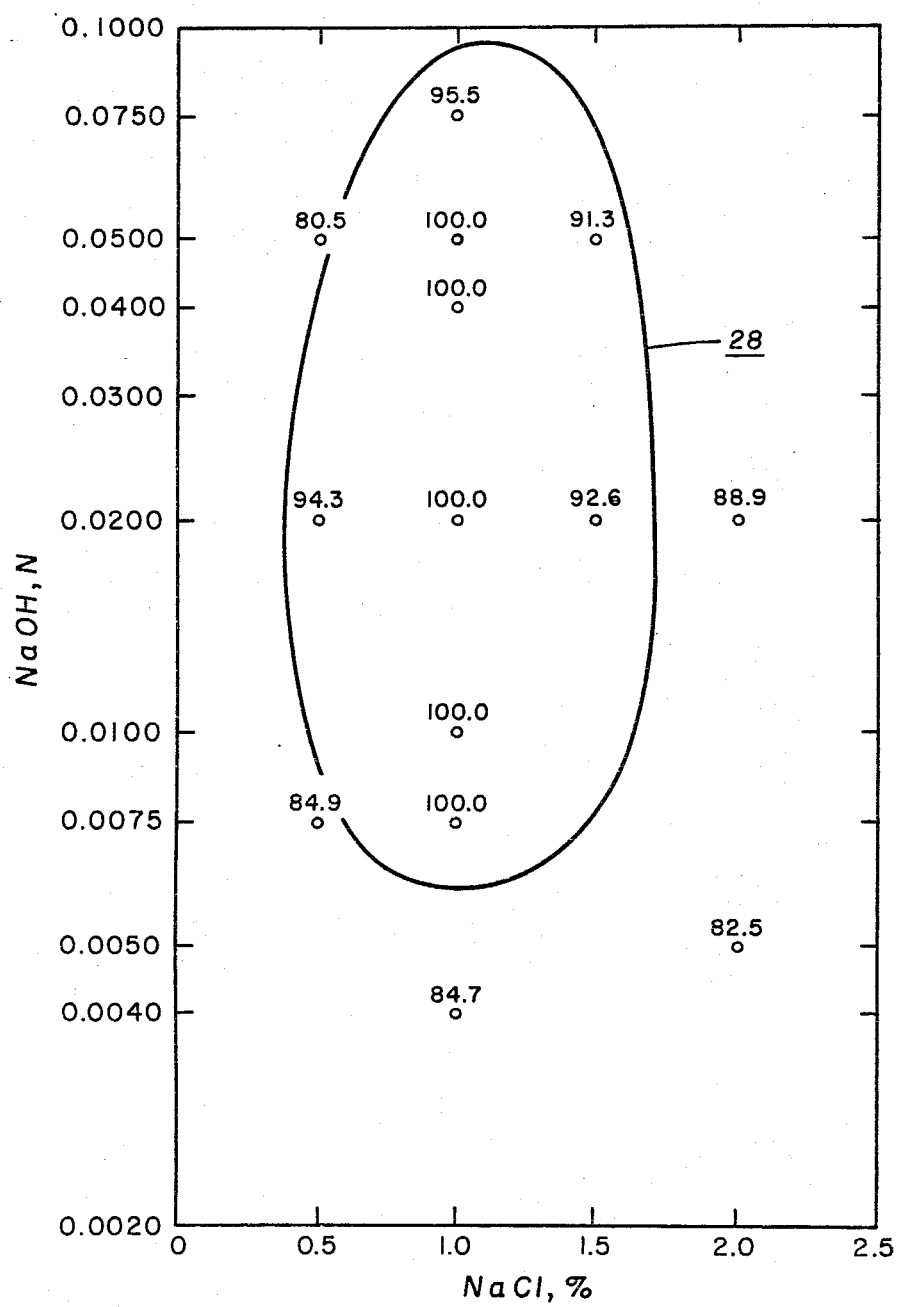

Turning now to the drawings, FIGS. 1, 2, and 3 are recovery maps which illustrate graphically certain of the data presented in Tables VI (oil No. 5), V (oil No. 4), and II (oil No. 1), respectively. In each of FIGS. 1 through 3, residual oil saturation or percent oil recovery is plotted against the log of the alkalinity of the displacement slug, expressed as sodium hydroxide normality, on the ordinate and the salinity of the displacing slug, expressed as weight percent of sodium chloride, on the abscissa. The data points in FIGS. 1 and 2 represent residual oil saturation and in FIG. 3, percent oil recovery. Curve 20 in FIG. 1 is an equal residual oil saturation line (at 15 percent residual oil saturation) for displacement runs carried out at room temperature (approximately 75°F.). As shown in FIG. 1, the region of relatively high oil displacement as indicated by 15 percent or less residual oil occurs generally within the envelope defined by curve 20 falling between about 0.005 to 0.03 N sodium hydroxide and about 0.5 to 2.0 weight percent sodium chloride.

Curve 22 of FIG. 1 is an equal residual oil saturation line, again at 15 percent residual oil saturation, based upon data from Table VI($b$) for displacement runs carried out at 119°F., intended to approximate the reservoir temperature. Comparison of curves 20 and 22 indicates that at the higher temperature the maximum recovery zone broadens somewhat in the higher regions of salinity and alkalinity. It will be noted that most of the high recovery zone falling within curve 20 falls also within curve 22.

In FIG. 2 curve 24 is an equal residual oil saturation line at a residual oil saturation of 7 percent for crude oil No. 4. It will be recalled that this crude oil exhibited a predominant asphaltene fraction which contained most of the identifiable acids and thus the primary recovery mechanism is thought to be wettability alteration. From this data accumulated, the optimum oil recovery in terms of minimum residual oil saturation was found to occur at a salinity of 4.0 weight percent sodium chloride and alkalinity of 0.001 N sodium hydroxide. It will be noted, however, that a low residual oil saturation (3.90 percent) was obtained at a sodium chloride concentration of 1.0 percent.

FIG. 3 illustrates a recovery map for crude oil No. 1 in which curve 28 is an equal recovery line (at 90 percent oil recovery). As can be seen from an examination of FIG. 3, 90 percent or better oil recovery occurred at sodium hydroxide concentrations slightly in excess of 0.005 N to near 0.1 N and sodium chloride concentrations within the range of about 0.4 to about 1.7 weight percent.

While the tests referred to thus far were carried out with sodium hydroxide, it is to be recognized that other alkalies, particularly the other alkali metal hydroxides, may be employed instead. For example, in tests carried out at optimum pH and salinity conditions on crude oil No. 2 (Table III), it was found that potassium hydroxide was only slightly less efficient than sodium hydroxide in displacing oil. Specifically, the use of 0.0075 N potassium hydroxide in a 1.0 percent sodium chloride solution resulted in a residual oil saturation of 2.5 percent compared with zero residual oil for sodium hydroxide under similar conditions. In employing ammonium hydroxide as the alkaline agent in carrying out displacement tests of oil No. 2, the lowest residual oil saturation achieved was 7.6 percent at 0.5 N ammonium hydroxide and 1.0 weight percent sodium chloride.

As a practical matter, sodium hydroxide is the most effective alkaline agent in terms of displacing efficiency and is also the least expensive in terms of the amount of agent required to adjust the pH of the alkaline solution within the desired range. Thus sodium hydroxide is preferred in carrying out the invention.

The salinity of the aqueous alkaline medium will usually be controlled by sodium chloride since this salt is inexpensive and normally will be readily available. However, salinity control can be accomplished by other monovalent salts, particularly the other alkali metal halides such as potassium chloride. Thus by the term "salinity" as used herein and in the appended claims is meant the dissolved monovalent salt content of the aqueous liquid expressed in weight percent.

While operating at the salinity and the alkalinity ranges of the present invention emphasizes the interfacial tension reduction mechanism in a manner to increase the efficiency of the water in microscopically displacing oil from the reservoir rock capillaries, the other recovery mechanisms may also be operative, depending upon the crude oil characteristics as described previously. Should the emulsification mechanism be present and result in the formation in situ of a relatively viscous emulsion, it may be unnecessary to add a thickner to the displacement medium for mobility control purposes. However, in most cases, the use of a separate thickening agent will also be desirable.

In this aspect of the invention, the polymeric thickening agent may be added to the initial alkaline displacing fluid or it may be injected as a separate slug. Usually it will be preferred to inject an initiation slug exhibiting an alkalinity and salinity within the ranges described previously and to follow this with a mobility control slug of similar alkalinity and salinity but containing in addition a thickening agent. Stated otherwise, the alkaline displacing medium may be considered as two slugs. The first, the initiation slug, is of a relatively low viscosity, e.g., about 1 centipoise, whereas the second slug, the mobility control slug, contains a thickening agent such that it is of a relatively high viscosity at least as great as the viscosity of the reservoir oil. Preferably the viscosity of at least a portion of the mobility control slug will be within the range of one to four times the viscosity of the reservoir oil.

Various thickening agents may be employed to increase the viscosity or apparent viscosity of the mobility control slug and include such natural materials as guar gum or karaya gum, or such synthetic products as Kelzan, identified previously, poly(glucosylglucan)s such as disclosed in U.S. Pat. No. 3,372,749 to Williams and available from the Pillsbury Company under the trade name "Polytran", or the partially hydrolyzed polyacrylamides available from the Dow Chemical Company under the trade name of "Pusher Chemicals". An ionic polysaccharide such as Kelzan usually will be preferred as the thickening agent since, although it undergoes some viscosity degradation at the pH range employed in the present invention, only relatively small quantities, normally 250 to 2500 ppm, are necessary to impart the desired viscosity to the water.

The use of an injection schedule involving sequential initiation and mobility control slugs accommodates the fact that the alkaline agent normally will move through the reservoir slower than the polymeric thickening agent. In this regard, both the alkaline agent and the thickening agent are subject to adsorption upon rock surfaces within the reservoir and will thus move through the reservoir by a chromatographic, adsorption-desorption process. Since the rate of desorption is less than the rate of adsorption, the thickening and alkaline agents are transported through the reservoir at a rate lower than that of the aqueous liquid in which they are dissolved or dispersed.

The alkaline agent adsorbs at a somewhat higher rate than a polymeric thickener such as Kelzan and in addition is depleted at the front portion of the alkaline solution as it reacts to neutralize the petroleum acids present in the reservoir oil. By employing the lower viscosity initiation slug ahead of the higher viscosity mobility control slug, the initiation slug will move through the reservoir more readily because of its higher mobility. In addition, the prior injection of the initiation slug will tend to prevent the polymeric thickening agent from advancing in front of the alkaline agent. If this were to occur, the displacement action would be essentially that of a polymer-type flood without taking advantage of the neutralization of petroleum acids to form surfactants in situ.

As has been recognized in the prior art, divalent metal ions such as calcium and magnesium have a deleterious effect on the alkaline waterflooding since such ions tend to precipitate the neutralized acids. Accordingly, where the formation water contains divalent metal ions in an amount of more than about 50 ppm it usually will be desirable to precede the alkaline initiation slug with a protective slug in order to displace the formation brine and provide a "buffer" between the formation brine and the initiation slug. Similar considerations prevail where the formation brine contains a relatively high concentration of monovalent salts such as sodium chloride. For example, if the formation brine exhibits a monovalent salt salinity significantly in excess of 2.0 percent, it usually will be preferred to inject a pretreatment slug regardless of the concentration of divalent metal ions present in the reservoir water. The pretreatment slug injected normally will contain sodium chloride in the range of 0.5 to 2.0 weight percent, and should of course be substantially free of divalent metal ions such as calcium and magnesium. As a practical matter, water containing divalent metal ions in a concentration no greater than 50 ppm may be used in forming the pretreatment slug and also the alkaline solution.

Figure 4:
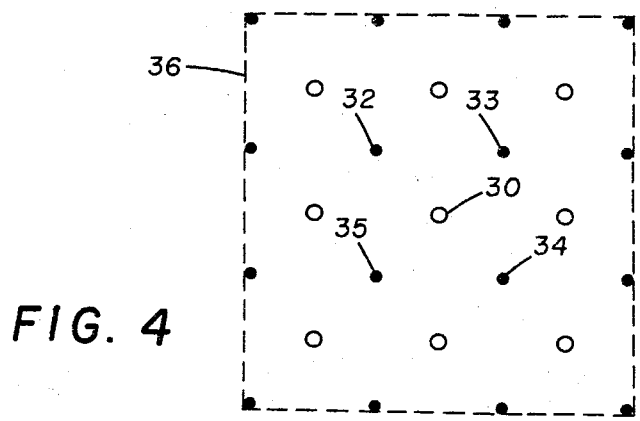
FIG. 4 is an illustration exhibiting one form of well pattern which may be employed in carrying out the present invention.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in FIG. 4. In this Figure, the legend o is used to indicate a production well and the legend $\pm$ is used to indicate an injection well. As shown in FIG. 4, this integrated pattern comprises a plurality of five-spot patterns, each of which comprises a central production well as indicated by reference character 30 and four peripheral injection wells as indicated by reference numerals 32, 33, 34, and 35. The term "pore volume", as used herein and in the appended claims to define the quantities of fluids injected in carrying out the invention, designates the pore volume of the formation underlying the well pattern defined by the wells comprising the injection and production systems. Thus the term "pore volume" as used with reference to the pattern shown in FIG. 4 is the pore volume of that portion of the formation underlying the area enclosed by broken line 36.

Of course, other well arrangements may be used in carrying out the present invention such as the direct or staggered line drive patterns, the four-spot, seven-spot, or nine-spot patterns, or circular flood patterns. For further description of these and other well arrangements which may be employed in waterflooding, reference is made to Calhoun, J. C., Jr., FUNDAMENTALS OF RESERVOIR ENGINEERING, Univ. of Oklahoma Press, Norman (1960), pp. 371–376, and Uren, L. C., PETROLEUM PRODUCTION ENGINEERING-OIL FIELD EXPLOITATION, McGraw-Hill Book Co., Inc., New York, Toronto and London (1953), pp. 528–534. It is to be recognized also that the invention may be carried out utilizing dually completed injection-production wells of the type disclosed, for example, in U.S. Pat. No. 2,725,106 to Spearow. This arrangement may sometimes be utilized to advantage in relatively thick reservoirs in which it is desirable to displace the oil in the reservoir upwardly and recover the oil from the upper portion of the reservoir.

With respect to quantities of the displacing fluids employed in the present invention, the initiation slug exhibiting an alkalinity and monovalent salt salinity within the aforementioned concentration ranges is injected in an amount within the range of 0.05 to 0.15 pore volume. This slug may, and in most cases will, be preceded by a protective slug in order to provide a buffer between the initiation slug and the reservoir brine. The protective slug, if employed, normally will be injected in an amount of up to 0.2 pore volume.

After injection of the initiation slug, the relatively viscous mobility control slug is injected in an amount within the range of 0.1 to 0.5 pore volume. This slug, as noted previously, also contains an alkaline agent and a monovalent salt within the concentration ranges of the present invention. Thus the total amount of alkaline displacing medium injected is within the range of 0.15 to 0.65 pore volume. The viscosity of the mobility control slug preferably is graded from a maximum viscosity of at least the viscosity of the reservoir oil to the viscosity of water. This is accomplished by progressively decreasing the concentration of polymeric thickening agent from its maximum value, normally a concentration within the range of 250 to 2500 ppm in the case of Kelzan, down to a concentration of zero. The thickening agent concentration may be decreased linearly or nonlinearly by increments.

Subsequent to the injection of the mobility control slug, a driving fluid is injected in order to displace the previously injected fluids through the formation. The driving fluid typically may be any water which is locally available and is not incompatible with the formation. The driving fluid is injected in such amount, normally within the range of 0.5 to 1.0 pore volume, as is necessary to carry the displacement process to completion.

We claim:
1. In the recovery of oil from a subterranean oil reservoir penetrated by spaced injection and production systems and containing oil having an acid number of at least 0.167, the method comprising:
  a. introducing into said reservoir via said injection system an aqueous alkaline solution in an amount within the range of 0.15 to 0.65 pore volume, said alkaline solution having a pH within the range of 11.5 to 13 and a monovalent salt salinity within the range of 0.5 to 2.0 weight percent,
  b. thereafter introducing into said reservoir via said injection system an aqueous flooding medium to displace oil to said production system, and
  c. recovering oil from said production system.
2. The method of claim 1 wherein said monovalent salt comprises sodium chloride.
3. The method of claim 2 wherein said aqueous alkaline solution contains an alkali metal hydroxide in a concentration range of 0.005 to 0.1 N.

4. The method of claim 3 wherein said alkali metal hydroxide is sodium hydroxide.

5. The method of claim 1 further comprising the step of prior to the injection of said aqueous alkaline solution, introducing into said reservoir via said injection system an aqueous protective slug which is substantially free of divalent salts and exhibits a monovalent salt salinity within the range of 0.5 to 2.0 weight percent.

6. In the recovery of oil from a subterranean oil reservoir penetrated by spaced injection and production systems and containing oil having an acid number of at least 0.167, the method comprising:
  a. introducing into said reservoir via said injection system an aqueous initiation slug in an amount within the range of 0.05 to 0.15 pore volume, said initiation slug containing an alkali metal hydroxide in an amount within the range of 0.005 N to 0.1 N and sodium chloride in a concentration within the range of 0.5 to 2.0 weight percent,
  b. thereafter introducing into said reservoir via said injection system an aqueous mobility control slug in an amount within the range of 0.1 to 0.5 pore volume, at least a portion of said mobility control slug containing a thickening agent in an amount to increase the viscosity thereof to a value greater than the viscosity of said initiation slug, and containing an alkali metal hydroxide in an amount within the range of 0.005 N to 0.1 N and sodium chloride in a concentration within the range of 0.5 to 2.0 weight percent,
  c. thereafter introducing into said reservoir via said injection system an aqueous flooding medium to displace oil to said production system, and
  d. recovering oil from said production system.

7. The method of claim 6 wherein said thickening agent is present in an amount to increase the viscosity of at least a portion of said mobility control slug to a value within the range of 1 to 4 times the viscosity of the oil in said reservoir.

8. The method of claim 7 wherein the concentration of said thickening agent in a latter portion of said mobility control slug is progressively decreased.

9. The method of claim 8 wherein said alkali metal hydroxide is sodium hydroxide.

10. The method of claim 6 further comprising the step of prior to the injection of said initiation slug, introducing into said reservoir via said injection system an aqueous protective slug which is substantially free of divalent salts and contains sodium chloride in a concentration within the range of 0.5 to 2.0 weight percent.

* * * * *

UNITED STATES PATENT OFFICE
CERTIFICATE OF CORRECTION

PATENT NO. : 3,927,716
DATED : December 23, 1975
INVENTOR(S) : Ralph F. Burdyn, Harry L. Chang and William R. Foster It is certified that error appears in the above–identified patent and that said Letters Patent are hereby corrected as shown below:

Column 7, line 64, "set" should read --sets--.

Column 8, last line of footnote for Table I should read
--a: Acid number of oil as diluted with 40% Klearol--.

Column 11, Table V, (Run No. 18) under "Fluid PV" column, "5.0" should read --2.35--; under "NaCl %" column, "0.0010" should read --5.0--; under "NaOH, N" column, should read --0.0010--.

Column 14, Table XV, (Run No. 8) under "Recovery %" column, "69.42" should read --69.62--.

Signed and Sealed this thirtieth Day of March 1976

[SEAL]

Attest:

RUTH C. MASON
Attesting Officer

C. MARSHALL DANN
Commissioner of Patents and Trademarks